United States Patent
Yamashita (10) Patent No.: US 9,597,941 B2
(45) Date of Patent: Mar. 21, 2017

(54) CYLINDER APPARATUS

(71) Applicant: HITACHI AUTOMOTIVE SYSTEMS, LTD., Ibaraki (JP)

(72) Inventor: Mikio Yamashita, Zama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 65 days.

(21) Appl. No.: 14/603,395

(22) Filed: Jan. 23, 2015

(65) Prior Publication Data
US 2015/0217621 A1 Aug. 6, 2015

(30) Foreign Application Priority Data
Jan. 31, 2014 (JP) .................................. 2014-17611

(51) Int. Cl.
*B60G 17/08* (2006.01)
*B60G 13/08* (2006.01)
*F16F 9/348* (2006.01)

(52) U.S. Cl.
CPC ............. *B60G 17/08* (2013.01); *B60G 13/08* (2013.01); *F16F 9/348* (2013.01); *B60G 2202/24* (2013.01); *B60G 2206/41* (2013.01); *B60G 2500/114* (2013.01)

(58) Field of Classification Search
CPC ...... F16F 9/34; F16F 9/348; F16F 9/18; F16F 9/49; B60G 17/08; B60G 13/08
USPC .......... 188/266.2, 266.6, 282.5, 282.6, 282.8
See application file for complete search history.

(56) References Cited

U.S. PATENT DOCUMENTS

| 8,544,619 B2* | 10/2013 | Yamaguchi | F16F 9/3485 188/266.6 |
| 2009/0272611 A1* | 11/2009 | Hayama | F16F 9/465 188/282.1 |
| 2011/0214955 A1* | 9/2011 | Maeda | F16F 9/34 188/280 |
| 2012/0305349 A1* | 12/2012 | Murakami | F16F 9/325 188/266.6 |

FOREIGN PATENT DOCUMENTS

JP  2006-38097  2/2006

* cited by examiner

*Primary Examiner* — Melanie Torres Williams
(74) *Attorney, Agent, or Firm* — Wenderoth, Lind & Ponack, L.L.P.

(57) ABSTRACT

In response to extension and compression of a piston rod, a piston slidingly moves in a cylinder, causing a flow of hydraulic oil. The hydraulic oil flow is controlled by a disk valve to generate a damping force. An elastic seal member fixed to the rear side of the disk valve is fitted to a recess in a pilot body to form a pilot chamber. The valve-opening operation of the disk valve is controlled by the pressure in the pilot chamber. The elastic seal member has an extension extended and fixed to the front side of the disk valve. Thus, forces acting on the rear and front sides of the disk valve due to shrinkage of the elastic seal member during fixing process balance and cancel each other out. Accordingly, it is possible to prevent warping of the disk valve and to obtain stable damping force characteristics.

15 Claims, 5 Drawing Sheets

CYLINDER APPARATUS

BACKGROUND OF THE INVENTION

The present invention relates to cylinder apparatus such as hydraulic shock absorbers.

A cylinder type hydraulic shock absorber as a cylinder apparatus attached, to a suspension system of a vehicle, e.g. an automobile, generally has a cylinder having a fluid sealed therein, a piston slidably fitted in the cylinder, a piston rod connected to the piston, and a damping force control mechanism comprising an orifice, a disk valve, etc. In response to a stroke of the piston rod, the piston slidingly moves in the cylinder, causing a flow of fluid. The fluid flow is controlled by the damping force control mechanism, thereby generating a damping force.

Japanese Patent Application Laid-open Publication No. 2006-38097 discloses a hydraulic shock absorber in which a back-pressure chamber (pilot chamber) is formed at the back of a disk valve constituting a damping force generating mechanism, and a part of the flow of fluid is introduced into the back-pressure chamber. The pressure in the back-pressure chamber is applied to the disk valve in the direction for closing the disk valve. The pressure in the back-pressure chamber is adjusted with a pilot valve to control the valve-opening operation of the disk valve. This arrangement makes it possible to increase the degree of freedom for adjusting damping force characteristics.

In the shock absorber disclosed in Japanese Patent Application Laid-Open Publication No. 2006-38097, a ring-shaped seal member made of an elastic material, e.g. rubber, is fixed to the outer periphery of the rear side of the disk valve by vulcanization bonding or the like. The seal member is slidably and fluid-tightly fitted to a cylindrical portion of a bottomed cylindrical member which is disposed at the back of the disk valve, thereby forming a back-pressure chamber.

With a disk valve having a ring-shaped seal member fixed to one side thereof as stated above, the seal member may contract in a manufacturing process where the seal member is fixed to a disk valve body. The contraction of the seal member may cause the disk valve body to be slightly deflected, resulting in degradation in flatness of the disk valve.

If the flatness of the disk valve is degraded, the disk valve cannot come in sufficiently close contact with the associated valve seat, so that the hydraulic fluid may leak, resulting in unstable damping force characteristics. Accordingly, conventional practice is to apply a set load (preload) to the disk valve when installed, i.e. to press the disk valve against the valve seat so as to slightly deflect the disk valve, thereby ensuring close contact between the disk valve and the valve seat. With, the conventional practice, however, the set load causes an increase in the valve-opening pressure of the disk valve; therefore, it becomes difficult to obtain a sufficiently small damping force in a low piston speed region. In recent years, a damping force control type shock absorber installed in a suspension system of a vehicle, e.g. an automobile, has been demanded to generate a sufficiently small damping force in a low piston speed region when the damping force characteristics are set to the "soft" side. In this regard, applying a set load, to the disk valve is contrary to the above-described demand.

SUMMARY OF THE INVENTION

The present invention has been made in view of the above-described circumstances.

Accordingly, an object of the present invention is to provide a cylinder apparatus made capable of obtaining stable damping force characteristics by reducing variations in flatness of a disk, valve having a seal member fixed thereto.

To solve the above-described problem, the present invention provides a cylinder apparatus including a cylinder having a fluid sealed therein, a piston slidably fitted in the cylinder, a piston rod connected to the piston, and a valve mechanism controlling a flow of fluid caused by sliding movement of the piston. The valve mechanism includes a disk valve having an annular elastic seal member fixed to one side thereof, and a pilot casing to which the elastic seal member is gas-tightly fitted to form, a pilot chamber applying the pressure therein to the dish valve. The elastic seal member has an extension extended and fixed to the other side of the disk valve.

DETAILED DESCRIPTION OF THE PREFERRED EMBODIMENTS

An embodiment of the present invention will be explained below in detail on the basis of the accompanying drawings.

Figure 1:
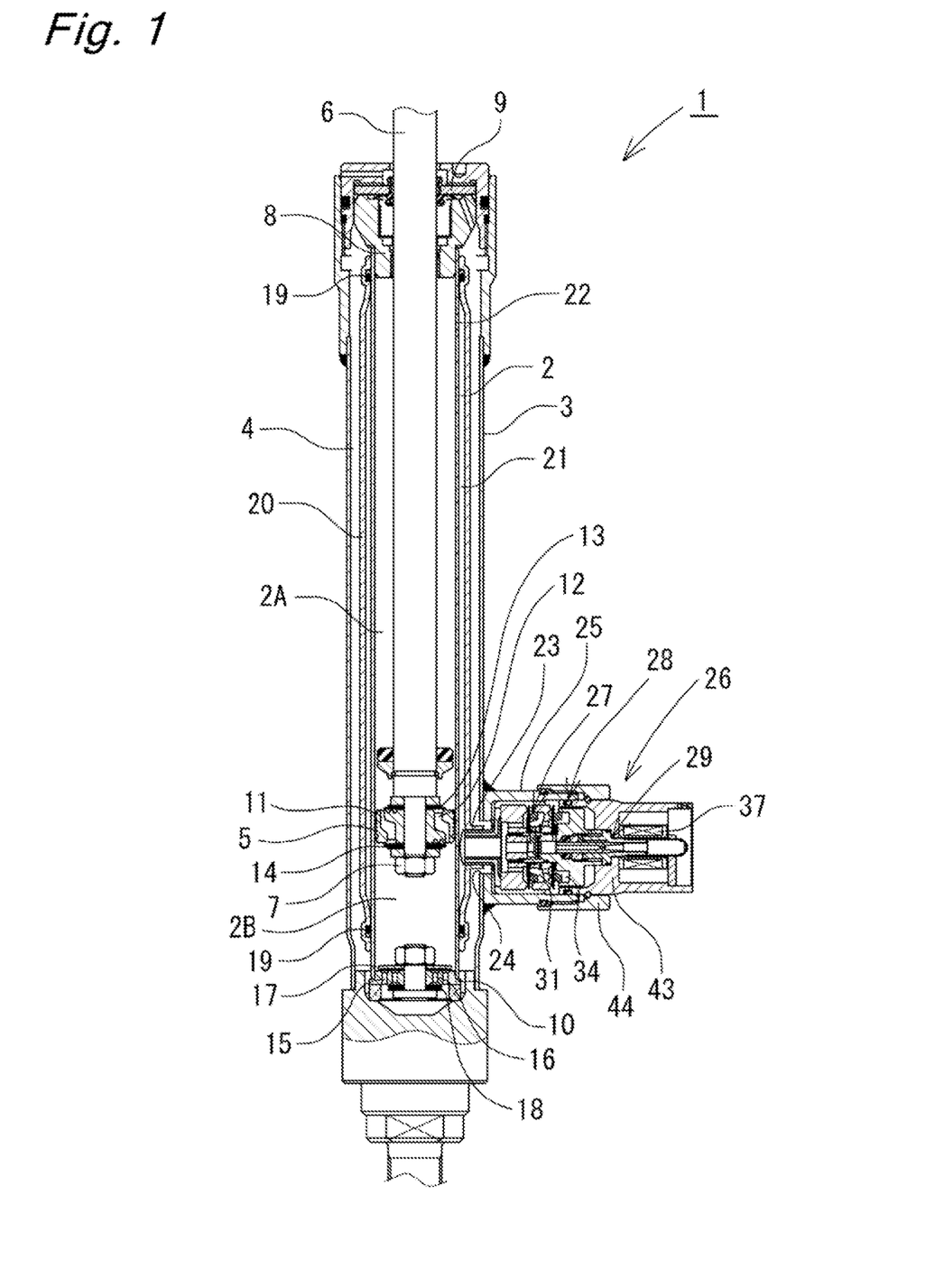
FIG. 1 is a vertical sectional view of a damping force control type shock, absorber according to an embodiment of the present invention.

As shown in FIG. 1, a damping force control type shock absorber 1, which is a cylinder apparatus according to this embodiment, has a dual-tube structure comprising a cylinder 2 and an outer tube 3 provided around the outer periphery of the cylinder 2. A reservoir 4 is formed between the cylinder 2 and the outer tube 3. A piston 5 is slidably fitted in the cylinder 2. The piston 5 divides the interior of the cylinder 2 into two chambers, i.e. a cylinder upper chamber 2A and a cylinder lower chamber 2B. One end of a piston rod 6 is connected to the piston 5 with a nut 7. The other end Of the piston rod 6 extends through the cylinder upper chamber 2A and further extends to the outside of the cylinder 2 through a rod guide 8 and an oil seal 9, which are fitted to the upper end portion of the dual-tube structure comprising the cylinder 2 and the outer tube 3. The lower end portion of the cylinder 2 is provided with a base valve 10 dividing the cylinder lower chamber 2B from the reservoir 4.

The piston 5 is provided with passages 11 and 12 communicating between the cylinder upper and lower chambers 2A and 2B. The passage 12 is provided with a check valve 13 allowing only a flow of fluid from the cylinder lower chamber 2B toward the cylinder upper chamber 2A. The check valve 13 is installed with a sufficiently small set load so that the check valve 13 opens the moment that the stroke of the piston rod 6 changes from the extension stroke to the compression stroke. The passage 11 is provided with a disk valve 14 that opens when the fluid pressure in the cylinder upper chamber 2A reaches a predetermined pressure during the extension stroke to relieve the fluid pressure in the cylinder upper chamber 2A to the cylinder lower chamber 2B. The valve-opening pressure of the disk valve 14 is set very high. That is, the valve-opening pressure of the disk valve 14 is set so that the disk valve 14 does not open during running on an ordinary road surface. Accordingly, the disk valve 14 is provided with an orifice 14A (see FIG. 3) constantly connecting between the cylinder upper and lower chambers 2A and 2B.

The base valve 10 is provided with passages 15 and 16 communicating between the cylinder lower chamber 2B and the reservoir 4. The passage 15 is provided with a cheek valve 17 allowing only a flow of fluid from the reservoir 4 toward the cylinder lower chamber 2B. The check valve 17 is installed with a sufficiently small set load so that the check valve 17 opens the moment that the stroke of the piston rod 6 changes from the compression stroke to the extension stroke. The passage 16 is provided with a disk valve 18 that opens when the fluid pressure in the cylinder lower chamber 2B reaches a predetermined pressure to relieve the fluid pressure in the cylinder lower chamber 2B to the reservoir 4. The valve-opening pressure of the disk valve 18 is set very high so that the disk valve 18 does not open during running on an ordinary road surface. The disk valve 18 is provided with an orifice 18A (see FIG. 3) constantly connecting between the cylinder lower chamber 2B and the reservoir 4. As hydraulic fluid, hydraulic oil is sealed in the cylinder 2, and the hydraulic oil and gas are sealed in the reservoir 4.

The cylinder 2 has a separator tube 20 fitted thereover with seal members 19 interposed therebetween at the upper and lower ends of the cylinder 2. Thus, an annular passage 21 is formed between the cylinder 2 and the separator tube 20. The annular passage 21 is communicated with the cylinder upper chamber 2A through a passage 22 provided in the side wall of the cylinder 2 at a position near the upper end thereof. It should be noted that there may be provided a plurality of circumferentially spaced passages 22 according to the specifications. The separator tube 20 has a cylindrical connecting opening 23 projecting sideward from a lower end part thereof. The side wall of the outer tube 3 is provided with an opening 24 in concentric relation to the connecting opening 23. The opening 24 is larger in diameter than the connecting opening 23. A cylindrical casing 25 is joined to the side wall of the outer tube 3 by welding or the like in such a manner as to surround the opening 24. A damping force generating mechanism 26 is provided to or installed in the casing 25.

Figure 2:
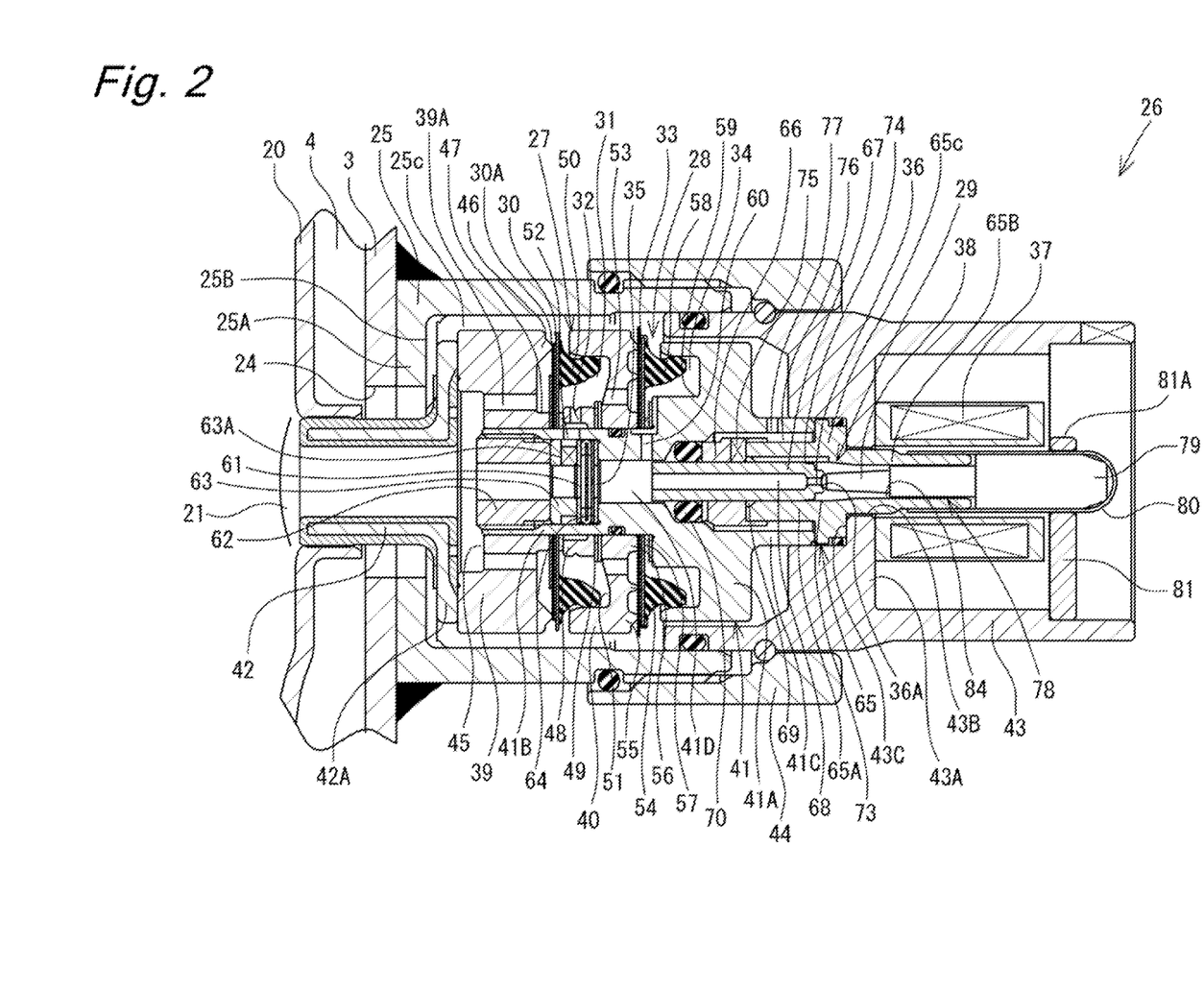
FIG. 2 is an enlarged vertical sectional view of a damping force generating mechanism of the damping force control type shock absorber shown in FIG. 1.
Figure 3:
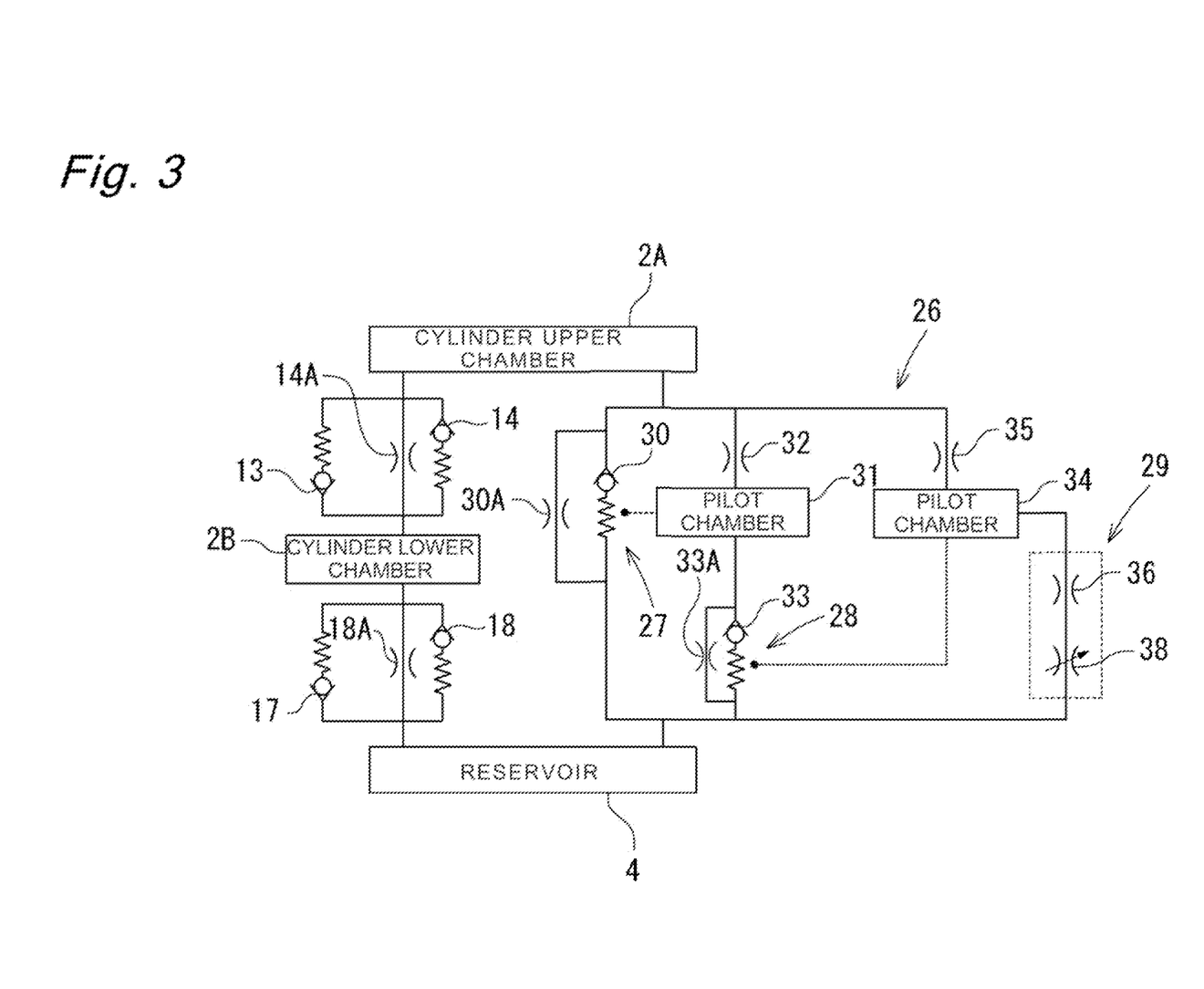
FIG. 3 is a hydraulic circuit diagram of the damping force control type shock absorber shown in FIG. 1.

Next, the damping force generating mechanism 26 will foe explained with reference mainly to FIGS. 2 and 3.

The damping force generating mechanism 26 has a main valve 27 and a control valve 28, which constitute a pilot-type valve mechanism, and a pilot valve 29 which is a solenoid-driven pressure control valve.

The main valve 27 has a disk valve 30 that opens upon receiving the pressure of fluid in the cylinder upper chamber 2A to allow the fluid to flow toward the reservoir 4, and a pilot chamber 31 that applies the pressure therein to the disk valve 30 in the direction for closing the disk valve 30. The pilot chamber 31 is connected to the cylinder upper chamber 2A through a fixed orifice 32 and also connected to the reservoir 4 through the control valve 28. The disk valve 30 is provided with an orifice 30A constantly connecting between the cylinder upper chamber 2A and the reservoir 4.

The control valve 28 has a disk valve 33 that opens upon receiving the pressure of fluid in the pilot chamber 31 to allow the fluid to flow toward the reservoir 4, and a pilot chamber 34 that applies the pressure therein to the disk valve 33 in the direction for closing the disk valve 33. The pilot chamber 34 is connected to the cylinder upper chamber 2A through a fixed orifice 35 and also connected to the reservoir 4 through the pilot valve 29. The disk valve 33 is provided with an orifice 33A constantly connecting between the pilot chamber 31 and the reservoir 4.

The pilot valve 29 adjusts the pressure in the pilot chamber 34 of the control, valve 28 by narrowing the flow path with a small-diameter port 36 and selectively opening and closing the port 36 by a valving element 38 driven by a solenoid 37. It should, be noted that the pressure-receiving area of the valving element 33 is reduced by reducing the diameter of the port 36, thereby making it possible to increase the pressure obtained when the pilot valve 29 is closed with the maximum electric current flowing through the solenoid 37, and thus making it possible to increase the differential pressure determined by the magnitude of the electric current, and hence possible to increase the variable width of damping force characteristics.

Next, a specific structure of the damping force generating mechanism 26 will be explained in more detail with reference mainly to FIG. 2.

A main body 39, a control body 40, and a pilot body 41 are disposed in a casing 25, together with a passage member 42. The main valve 27, the control valve 28, and the pilot valve 29 are incorporated in the main body 39, the control body 40, and the pilot body 41, respectively. A solenoid casing 43 is secured to an opening end of the casing 25 with a nut 44, thereby sealing the interior of the casing 25 and securing the above-described members, i.e. the main valve 27, the control valve 28, and the pilot valve 29, to the casing 25. The solenoid casing 43 is in the shape of a substantially circular cylinder, the interior of which is axially divided by an intermediate wall 43A. One end of the solenoid casing 43 is inserted and fitted in the casing 25. The other end of the solenoid casing 43 projects out of the casing 25, and in this state, the solenoid casing 43 is secured to the casing 25 with the nut 44. The intermediate wall 43A has an opening 43B extending through the center thereof and further has an annular recess 43C formed around one end of the opening 43B.

The passage member 42 is a cylindrical member having a flange portion 42A around the outer periphery of one end thereof. The flange portion 42A abuts against an inward flange portion 25A of the casing 25. The cylindrical portion of the passage member 42 is liquid-tightly inserted into the connecting opening 23 of the separator tube 20 and connected to the annular passage 21. The inward flange portion 25A of the casing 25 has a plurality of radially extending passage grooves 25B. The reservoir 4 and a chamber 25C in the casing 25 are communicated with each other through the passage grooves 25B and the opening 24 of the outer tube 3.

The main body 39 and the control body 40 are annular members. The pilot body 41 is in the shape of a stepped cylinder having a large-diameter portion 41A in the middle thereof. A cylindrical portion 41E at one end of the pilot body 41 is inserted, into the main body 39 and the control body 40. Further, a cylindrical portion 41C at the other end of the pilot body 41 is fitted into the recess 430 of the intermediate wall 43A of the solenoid casing 43. Thus, the main body 39, the control, body 40, the pilot body 41, and the solenoid casing 43 are concentrically positioned with respect to each other.

The main body 39 is provided with a plurality of circumferentially spaced passages 39A axially extending therethrough. The passages 39A communicate with the passage member 42 through an annular recess 45 formed at one end of the main body 39. The other end of the main body 39 has an annular seat portion 46 projecting at the outer periphery side of the openings of the circumferentially spaced passages 39A and further has an annular clamp portion 47 projecting at the inner periphery side of the openings of the passages 39A. The disk valve 30, which constitutes the main valve 27, is seated at an outer peripheral portion thereof on the seat portion 46 of the main body 39. The inner peripheral portion of the disk valve 30 is clamped, together with an annular retainer 48 and a washer 49, between the clamp portion 47 and the control body 40. The disk valve 30 has an annular elastic seal member 50 fixed to the outer peripheral portion of the rear side thereof. The elastic seal member 50 is made of an elastic material, e.g. rubber, and fixed to the disk valve 30 by vulcanizing bonding or the like. The disk valve 30 comprises pliable disk-shaped valving elements stacked appropriately so that desired flexibility characteristics can be obtained. The disk valve 30 has a notch formed on the outer peripheral portion thereof. The notch constitutes an orifice 30A constantly providing communication between the passages 39A and the chamber 25C in the casing 25.

The control body 40 has an annular recess 51 formed at one end thereof. The outer peripheral portion of the elastic seal member 50 fixed to the disk valve 30 is slidably and liquid-tightly fitted in the recess 51 to form a pilot chamber 31 in the recess 51. The disk valve 30 lifts from the seat portion 46 to open upon receiving the pressure in the passages 39A, thereby allowing the passages 39A to communicate with the chamber 25C in the casing 25. The pressure in the pilot chamber 31 acts on the disk valve 30 in the direction for closing the disk valve 30. The pilot chamber 31 communicates with the interior of the cylindrical portion 41B through a fixed orifice 32 provided in the side wall of the retainer 48 and through a passage 52 provided in the side wall of the cylindrical portion 41B of the pilot body 41 and further communicates with the passage member 42. The bottom of the control body 40, which forms the annular recess 51, is formed so that the thickness thereof increases with the distance toward the center thereof, i.e. toward the pilot body 41. The reason for this is as follows. The portion of the bottom of the control body 40 that is closer to the center thereof, i.e. closer to the pilot body 41, needs to be rigid because an axial force is applied thereto. Therefore, the necessary thickness is ensured, for the bottom of the control body 40. In contrast to this, the portion of the bottom of the control body 40 closer to the outer periphery thereof is formed thinner than the portion of the bottom of the control body 40 closer to the center thereof in order to ensure the necessary volume for the pilot chamber 31.

The control body 40 is provided with a plurality of circumferentially spaced passages 53 axially extending therethrough to communicate at one end thereof with the pilot chamber 31. The other end of the control body 40 is provided with an annular inner seat portion 54 projecting at the outer periphery side of the openings of the circumferentially spaced passages 53. Further, the other end of the control body 40 is provided with an outer seat portion 55 projecting at the outer periphery side of the inner seat portion 54. In addition, the other end of the control body 40 is provided with an annular clamp portion 56 projecting at the inner periphery side of the circumferentially spaced passages 53. A disk valve 33 constituting the control valve 28 is seated on the inner and outer seat portions 54 and 55.

The inner peripheral portion of the disk valve 33 is clamped, together with a washer 57, between the clamp portion 56 and the large-diameter portion 41A of the pilot body 41. The disk valve 33 has an annular elastic seal member 58 fixed to the outer peripheral portion of the rear side thereof. The elastic seal member 58 is made of an elastic material, e.g. rubber, and fixed to the disk valve 33 by vulcanizing bonding or the like. The disk valve 33 comprises pliable disk-shaped valving elements stacked appropriately so that desired flexibility characteristics can be obtained. The disk valve 33 will be further detailed later.

The large-diameter portion 41A of the pilot body 41 has an annular recess 59 formed at one end thereof. The recess 59 constitutes a pilot casing that forms a pilot chamber 34. The outer peripheral portion of the elastic seal member 58 fixed to the disk valve 33 is slidably and liquid-tightly fitted in the annular recess 59 to form the pilot chamber 34 in the recess 59. The disk valve 33 lifts sequentially from the outer and inner seat portions 55 and 54 to open upon receiving the pressure in the passages 53, which communicate with the pilot chamber 31 of the main valve 27, thereby allowing the passages 53 to communicate with the chamber 25C in the casing 25. The pressure in the pilot chamber 34 acts on the disk valve 33 in the direction for closing the disk valve 33. The pilot chamber 34 communicates with a passage 41D in the cylindrical portion 41B through a passage 60 provided in the side wall of the pilot body 41 and further communicates with the interior of the passage member 42 through a fixed orifice 35 and a filter 51, which are provided in the cylindrical portion 41B. The fixed orifice 35 and the filter 61 are secured to a step portion 64 in the cylindrical portion 41B with a cylindrical retainer 62 screwed into the distal end of the cylindrical portion 41B of the pilot body 41, with a spacer 63 interposed therebetween. The side wall of the spacer 63 is provided with a notch 63A for allowing the fixed orifice 35 to communicate with the passage 41D in the cylindrical portion 41B.

A guide member 65 is inserted into the cylindrical portion 41C at the other end of the pilot body 41 and the opening 43B and recess 43C of the solenoid casing 43. The guide member 65 is formed in the shape of a stepped circular cylinder, which has a small-diameter port press-fit portion 65A at one end thereof and a small-diameter plunger-guide portion 65B at the other end thereof. The guide member 65 further has a large-diameter portion 65C in the middle thereof. The guide member 65 has its port press-fit portion 65A inserted into the cylindrical portion 41C of the pilot body 41 with a gap therebetween. The plunger-guide portion 65E is inserted through the opening 43B of the solenoid casing 43 to project into the other end portion of the solenoid casing 43. The large-diameter portion 65C is fitted in the recess 43C of the solenoid casing 43 and secured in abutting contact with the cylindrical portion 41C of the pilot body 41 inserted and fitted in the recess 43C.

The guide member 65 has a substantially cylindrical port member 67 press-fitted and secured in the port press-fit portion 65A. The port press-fit portion 65A has an annular retainer 66 attached to the distal end thereof. An O-ring 70 provided a seal between the outer peripheral surface of the port member 67 and the inner peripheral surface of the cylindrical portion 41C of the pilot body 41. A passage 68 in the port member 67 communicates with the passage 41D in the pilot body 41.

The end portion of the port member 67, which is press-fitted into the guide member 65, has a port 36 formed by reducing the inner diameter of the passage 68. The port 36 opens into a valve chamber 73 formed in the guide member 65. The valve chamber 73 communicates with the chamber 25C in the casing 25 through an axial groove 74 formed in the port press-fit portion 65A of the guide member 65, an annular recess 69 formed on the inner peripheral edge of the opening of the port press-fit portion 65A, a radial passage 75 formed in the retainer 66, an annular gap 76 between the port press-fit portion 65A of the guide member 65 and the cylindrical portion 41C of the pilot body 41, and a passage 77 extending through the side wall of the cylindrical portion 41C. The passage 68 in the port member 67 communicates with the pilot chamber 34 through the passage 60 and further communicates with the interior of the passage member 42 through the fixed orifice 35 and the filter 61.

A plunger 78 is inserted in the plunger-guide portion 65B of the guide member 65. The plunger 78 is guided in the plunger-guide portion 65B slidably in the axial direction thereof. The plunger 78 has a tapered valving element 38 provided at the distal end thereof. The valving element 38 is inserted into the valve chamber 73 in the guide member 65 to selectively open and close the port 36 by unseating from and seating on a seat portion 36A at the end of the port member 67. The plunger 78 has a large-diameter armature 79 provided at the proximal end thereof. The armature 79 is disposed outside the plunger-guide portion 65B. The plunger-guide portion 65B has a substantially bottomed cylindrical cover 80 attached thereto to cover the armature 79. The cover 80 guides the armature 79 axially movably.

In the solenoid casing 43, a solenoid 37 is provided. The solenoid 37 is disposed, around the plunger-guide portion 65B projecting from the intermediate wall 43A of the solenoid casing 43 and around the cover 80. The solenoid 37 is secured by a closing member 81 attached to the opening portion of the solenoid casing 43. A lead wire (not shown) connected to the solenoid 37 is extended to the outside through a notch 81A formed in the closing member 81. A return spring 84 is provided between the plunger 78 and the port member 67. The spring force of the return, spring 84 urges the valving element 38 in a valve-opening direction in which the valving element 38 separates from the seat portion 36A to open the port 36. When the solenoid 37 is energized, the plunger 78 generates thrust, causing the valving element 38 to move against the spring force of the return spring 84 in a valve-closing direction in which the valving element 38 seats on the seat portion 36A to close the port 36.

Next, the disk valve 33 of the control valve 28 will be explained in more detail with reference to FIGS. 4 to 6.

Figure 4:
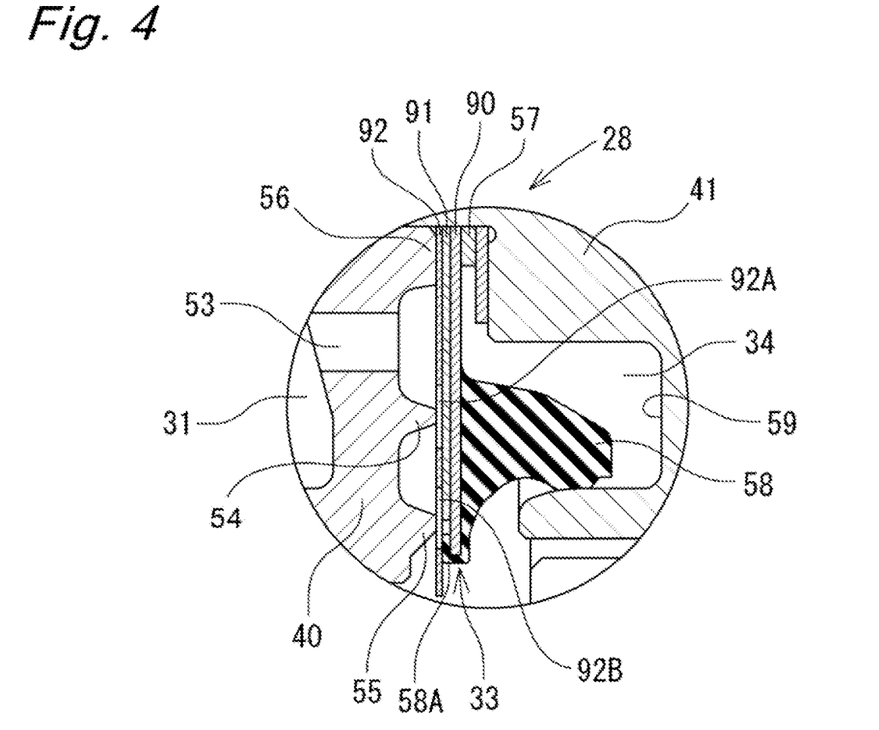
FIG. 4 is an enlarged view of a disk valve part of the damping force generating mechanism shown in FIG. 2.

As shown in FIG. 4, the disk valve 33 comprises a metallic disk body 90 having an elastic seal member 58 fixed to one side thereof, i.e. the rear side (side closer to the pilot chamber 34) thereof. On the other side of the disk valve 33, i.e. the front side (side closer to the inner and outer seat portions 54 and 55), is disposed a stack of disk-shaped spacer 91 and a seat disk 92.

Figure 5:
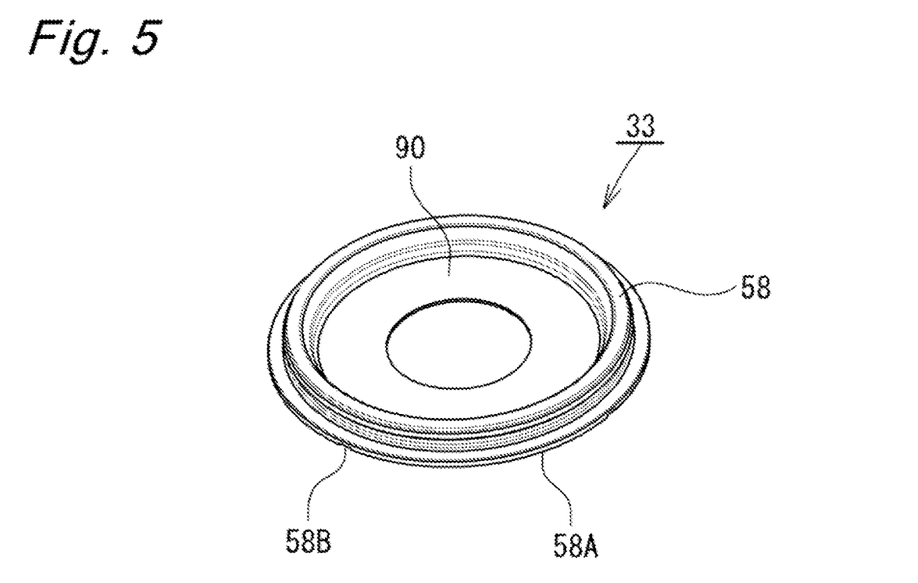
FIG. 5 is a perspective view of the disk valve shown in FIG. 4, as seen from the elastic seal member side.
Figure 6:
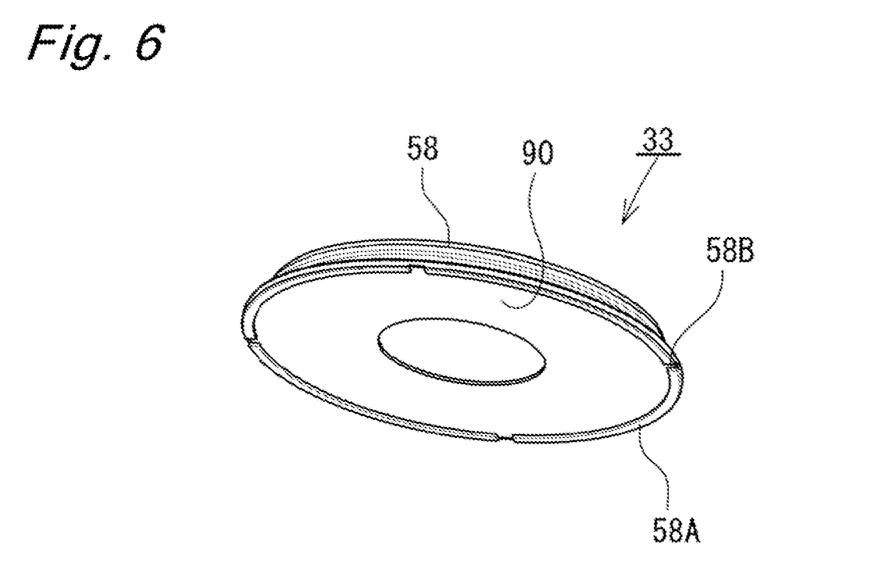
FIG. 6 is a perspective view of the disk valve shown in FIG. 4, as seen from the disk body side.

Referring also to FIGS. 5 and 6, the dish valve 33 has an annular elastic seal member 58 fixed to an outer peripheral portion of the rear side of the disk body 90. The elastic seal member 58 is made of an elastic material, e.g. rubber. The elastic seal, member 58 is thin-walled at an outer peripheral portion thereof to form an extension 58A that is extended, over the enter peripheral surface of the disk body 90 and fixed to an outer peripheral portion of the front side of the disk, body 90. Thus, the elastic seal member 58 covers the outer peripheral portions of both sides of the disk body 90. The thin-wailed outer peripheral portion of the elastic seal member 58, including the extension 58A, has a substantially uniform wall thickness. The portion of the extension 58A of the elastic seal member 58 that is fixed to the front side of the disk body 90 is provided with notches 53B radially extending therethrough. In this embodiment, four circumferentially equally spaced notches 58B are provided. However, the notches 58B may be disposed in other configurations. In this embodiment, the elastic seal member 50 is made of rubber and fixed to the disk body 30 by vulcanizing bonding.

The spacer 91, which is stacked on the front side of the disk valve 33, has a diameter smaller than the inner diameter of the extension 58A of the elastic seal member 58 and has a plate thickness substantially equal to or smaller than the wall thickness of the extension 58A. The seat disk 92, which is stacked on the front side of the spacer 91, has a diameter equal to or larger than that of the disk valve 33 as covered with the elastic seal member 58 (in this embodiment, the seat disk 92 is larger in diameter than the disk valve 33). The seat disk 92 has orifice holes 92A and 32B provided at positions facing the inner and outer seat portions 54 and 55, respectively. The orifice holes 92A and 92B form an orifice 33A constantly providing communication between the pilot chamber 31 and the chamber 25C.

The disk valve 33, the spacer 91, and the seat disk 92 are flat plate-shaped members. The clamp portion 56 and inner and outer seat portions 54 and 55 of the control body 40 are substantially equal in projection height to each other. Consequently, the disk valve 33 (seat disk 92) is seated on the inner and outer seat portions 54 and 55 with a sufficiently small (substantially zero) set load (preload), i.e. without being deflected.

The following is an explanation of the operation of the damping force control type shock absorber 1 constructed as stated above.

The damping force control type shock absorber 1 is installed between sprung and unsprung members of a suspension system of a vehicle. The damping force control type shock absorber 1 operates according to commands from an in-vehicle controller or the like. In a normal operating state, when the solenoid 37 is energized, the plunger 78 generates thrust, causing the valving element 38 to seat on the seat portion 36A, thus executing pressure control with the pilot valve 29.

During the extension stroke of the piston rod 6, the movement of the piston 5 in the cylinder 2 closes the check valve 13 of the piston 5. Before the disk valve 14 opens, the fluid in the cylinder upper chamber 2A, which serves as an upstream chamber, is pressurized to pass through the passage 22 and the annular passage 21 and to flow into the passage member 42 of the damping force generating mechanism 26 from the connecting opening 23 of the separator tube 20.

At this time, an amount of hydraulic oil corresponding to the amount of movement of the piston 5 flows into the cylinder lower chamber 2B from the reservoir 4 by opening the check valve 17 of the base valve 10. It should be noted that, when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive increase in pressure in the cylinder upper chamber 2A.

During the compression stroke of the piston rod 6, the movement of the piston 5 in the cylinder 2 opens the check valve 13 of the piston 5 and closes the check valve 17 for the passage 15 in the base valve 10. Before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A, which serves as an upstream chamber, into the reservoir 4 through a flow path similar to that during the above-described extension stroke. It should be noted that, when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive increase in pressure in the cylinder lower chamber 23.

In the damping force generating mechanism 26, the hydraulic oil flowing in from the passage member 42 flows into the reservoir 4, which serves as a downstream chamber, mainly through the following three flow paths (main flow path, control flow path, and pilot flow path).

(1) Main Flow Path

The hydraulic oil flowing in from the passage member 42 passes through the passages 39A in the main body 39, opens the disk valve 30 of the main valve 27 to flow into the chamber 25C in the casing 25, and flows into the reservoir 4 through the passage grooves 25B and the opening 24.

(2) Control Flow Path

The hydraulic oil flowing into the passage member 42 passes through the insides of the retainer 52 and the spacer 63, which are provided in the cylindrical portion 41B of the pilot body 41, and through the notch 63A of the spacer 63, the passage 52 in the side wall of the cylindrical portion 41B, and the fixed orifice 32 to flow into the pilot chamber 31. From the pilot chamber 31, the hydraulic oil further passes through the passages 53 in the control body 40, opens the disk valve 33 of the control valve 28 to flow into the chamber 25C in the casing 25, and passes through the passage grooves 25B and the opening 24 to flow into the reservoir 4.

(3) Pilot Flow Path

The hydraulic oil flowing into the passage member 42 passes through the insides of the retainer 62 and the spacer 63, the filter 61, the fixed orifice 35, and the passage 41D, which are provided in the cylindrical portion 41B of the pilot body 41. The hydraulic oil further passes through the passage 68 and port 36 in the port member 67 and opens the valving element 38 of the pilot valve 29 to flow into the valve chamber 73. Further, the hydraulic oil passes through the axial groove 74, the annular recess 69, the radial passage 75, the gap 76, and the passage 77 to flow into the chamber 25C in the casing 25 and further passes through the passage grooves 25B and the opening 24 to flow into the reservoir 4.

Thus, during both the extension and compression strokes of the piston rod 6, damping force is generated by the main valve 27, control valve 28 and pilot valve 29 of the damping force generating mechanism 26. At this time, the disk valve 30 of the main valve 27 opens upon receiving the pressure in the passages 39A, and the pressure in the pilot chamber 31, which is provided at the back of the disk valve 30, acts on the disk valve 30 in the direction for closing the disk valve 30. That is, the disk valve 30 opens according to the differential pressure between the pressure in the passages 39A and that in the pilot chamber 31. Therefore, the valve-opening pressure of the disk valve 30 varies according to the pressure in the pilot chamber 31. When the pressure in the pilot chamber 31 is low, the valve-opening pressure is low; when the pressure in the pilot chamber 31 is high, the valve-opening pressure is high.

The disk valve 33 of the control valve 28 opens upon receiving the pressure in the passages 53, and the pressure in the pilot chamber 34, which is provided at the back of the disk valve 33, acts on the disk valve 33 in the direction for closing the disk valve 33. That is, the disk valve 33 opens according to the differential pressure between the pressure in the passages 53 and that in the pilot chamber 34. Therefore, the valve-opening pressure of the disk valve 33 varies according to the pressure in the pilot chamber 34. When the pressure in the pilot chamber 34 is low, the valve-opening pressure is low; when the pressure in the pilot chamber 34 is high, the valve-opening pressure is high.

When the piston speed is in a low speed region, the main valve 27 and the control valve 28 are closed. The hydraulic oil flows into the reservoir 4 mainly through the above-described, pilot flow path (3) and through the orifice holes 92A and 92B (orifice 33A) provided in the disk valve 33 of the control valve 23. Accordingly, a damping force is generated by the pilot valve 29 and the orifice 33A. As the piston speed increases, the pressure on the upstream side of the pilot valve 29 increases. At this time, the pressures in the pilot chambers 31 and 34, which are upstream of the pilot valve 29, are controlled by the pilot valve 29. That is, when the pilot valve 29 opens, the pressures in the pilot chambers 31 and 34 reduce. That is, when the pilot valve 29 opens, first, the disk valve 33 of the control valve 28 opens, and the hydraulic oil flows into the reservoir 4 through the above-described control flow path (2) in addition to the pilot flow path (3). Thus, the increase in damping force due to the increase in piston speed is suppressed (see point A in FIG. 7).

When the disk valve 33 of the control valve 28 opens, the pressure in the pilot chamber 31 reduces. As a result of the reduction in pressure in the pilot chamber 31, the disk valve 30 of the main valve 27 opens. Consequently, the hydraulic oil flows into the reservoir 4 through the above-described main flow path (1) in addition to the pilot flow path (3) and the control flow path (2). Thus, the increase in damping force due to the increase in piston speed is suppressed (see point B in FIG. 7).

Thus, the increase in damping force due to the increase in piston speed is suppressed in two steps, thereby allowing appropriate damping force characteristics to be obtained. In addition, it is possible to control the pressure in the pilot chamber 34 of the control valve 23, i.e. the valve-opening pressure of the disk valve 33, by adjusting the control pressure of the pilot valve 29 through energization of the solenoid 37. Further, it is possible to control the pressure in the pilot chamber 31 of the main valve 27, i.e. the valve-opening pressure of the disk valve 30, by controlling the valve-opening pressure of the disk valve 33.

Figure 7:
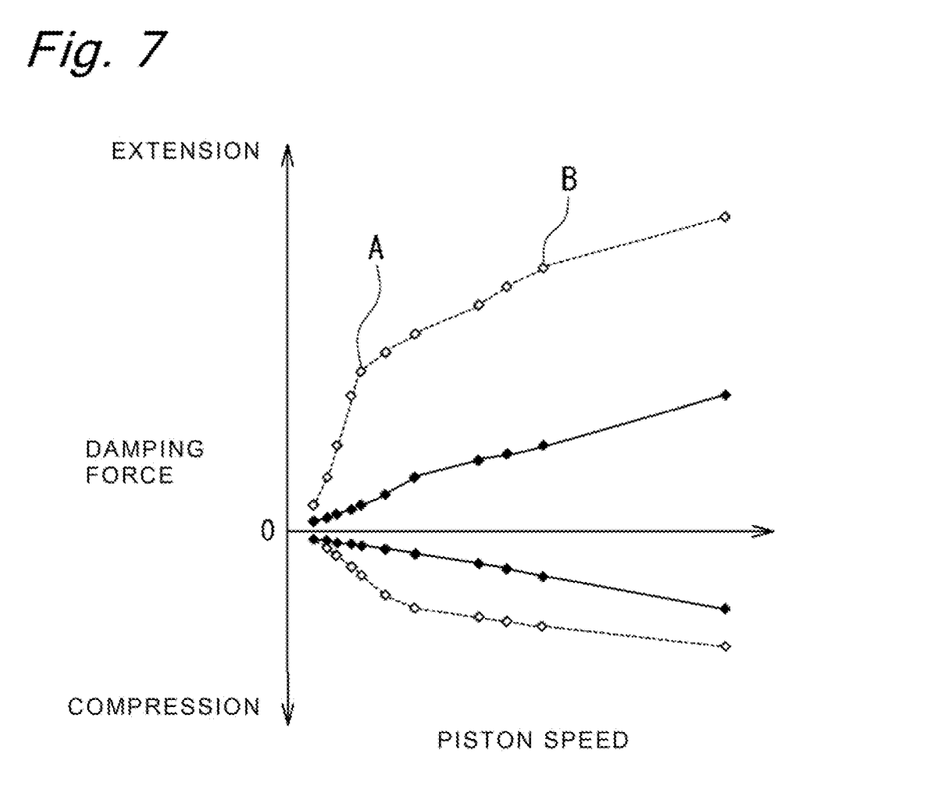
FIG. 7 is a graph showing damping force characteristics of the damping force control type shock absorber shown in FIG. 1

Thus, in a piston speed region where the main valve 27 is closed, a sufficient flow rate of hydraulic oil can foe obtained because the disk valve 33 of the control valve 28 opens in addition to the pilot valve 29. Accordingly, the flow rate through the pilot valve 29 (i.e. the flow path area of the port 36) can be reduced, and it becomes possible to reduce the size of the pilot valve 29 (solenoid valve) and to save power consumption of the solenoid 37. In addition, because the damping force can be changed in two steps by the main valve 27 and the control valve 28, it is possible to increase the degree of freedom for adjusting damping force characteristics and hence possible to obtain appropriate damping force characteristics. FIG. 7 shows the damping force characteristics of the damping force control type shock absorber 1.

Because the disk valve 33 of the control valve 28 is installed with a sufficiently small set load (preload) so that the valve-opening pressure of the disk valve 33 is low, the disk valve 33 can be opened in a very low piston speed region. Accordingly, small damping force can be generated stably at the time of starting the generation of damping force. Because the disk valve 33 has the elastic seal member 58 with the extension 58A fixed over both sides thereof, forces acting on the rear and front sides of the disk body 90 due to shrinkage of the elastic seal member 58 during fixing by vulcanization bonding or the like balance and cancel each other out. Thus, it is possible to prevent warping of the disk body 90 due to shrinkage of the elastic seal member 58 and hence possible to improve the flatness of the disk body 90. As a result, it is possible to ensure close contact between the disk valve 33 (seat disk 92) and the inner and outer seat portions 54 and 55 even when the set load of the disk valve 33 is small, or even when no set load is applied to the disk valve 33. Accordingly, stable damping force characteristics can be obtained even, in a very low piston speed region. In addition, the valve-opening pressure of the disk valve 33 can be made sufficiently low, so that the damping force in the low piston speed region can be sufficiently reduced when the damping force characteristics are set to the "soft" side.

Particularly, when the valve-opening operation of the pilot-type main valve 27 is controlled by the pilot-type control valve 28 as in the foregoing embodiment, damping force can be made to rise smoothly in a very low piston speed region by setting the valve-opening pressure of the control valve 28 to a low level. It is therefore possible to obtain ideal damping force characteristics for a vehicle suspension system.

By setting the outer diameter of the seat disk 92 larger than that of the disk valve 33, the extension 58A of the elastic seal member 58 can be prevented from being damaged by the outer peripheral edge of the seat disk 92. In addition, the notches 58B provided in the extension 58A serve as an air vent passage that allows the space between the disk valve 33 and the seat disk 92 to communicate with the downstream side of the control valve 28. Therefore, air venting can be carried out smoothly.

It should be noted that, in the foregoing embodiment, the elastic seal member 50 of the disk valve 30 of the main valve 27 may be provided with an extension in the same way as the disk valve 33 of the control valve 28. Further, in the foregoing embodiment, the extension 58A is an integral part of the elastic seal member 58 which is extended over the outer peripheral surface of the disk body 90 and fixed to an outer peripheral portion of the front side thereof so that the elastic seal member 58 covers the outer peripheral portions of both sides of the disk body 90. It should, however, be noted that the elastic seal member 58 and the extension 58A may be separate members from each other. In other words, the elastic seal member 58 need not necessarily be fixed to the outer peripheral surface of the disk body 90. The present invention is also applicable to cylinder apparatus in which the damping force control mechanism is provided in the piston assembly, in addition to cylinder apparatus in which the damping force control mechanism is disposed at the side of the cylinder as in the foregoing embodiment. Although in the foregoing embodiment the present invention, has been explained with regard to a damping force control type shock absorber using hydraulic oil as a hydraulic fluid as one example of cylinder apparatus, the present invention is not limited thereto but may be similarly applied to any cylinder apparatus having a disk valve using a pilot type damping valve with an elastic seal member fixed thereto, e.g. a damping force non-adjustable shock absorber, a gas spring, a lock apparatus, a hydraulic cylinder for suspension, etc.

Any features of the embodiments can be combined.

According to the cylinder apparatus of the embodiments as stated above, stable damping force characteristics can be obtained by reducing variations in flatness of a disk valve having a seal member fixed thereto.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2014-17611 filed on Jan. 31, 2014.

The entire disclosure of Japanese Patent Application No. 2014-17611 filed on Jan. 31, 2014 including specification, claims, drawings and summary are incorporated herein by reference in its entirety.

What is claimed is:

1. A cylinder apparatus comprising:
   a cylinder having a fluid sealed therein;
   a piston slidably fitted in the cylinder;
   a piston rod connected to the piston; and
   a valve mechanism configured to control a flow of fluid caused by sliding movement of the piston;
   the valve mechanism including:
   a disk valve having an annular elastic seal member fixed to a first side thereof; and
   a pilot casing to which the elastic seal member is gas-tightly fitted to form a pilot chamber configured to apply a pressure therein to the disk valve;
   wherein the elastic seal member has an extension that is extended over an outer peripheral surface of the disk valve and fixed to a second side of the disk valve.

2. The cylinder apparatus of claim 1, wherein a seat disk is stacked over the second side of the disk valve, the seat disk being seatable on a seat portion of the valve mechanism.

3. The cylinder apparatus of claim 2, wherein the seat disk has an outer diameter not less than that of the disk valve having the elastic seal member fixed thereto.

4. The cylinder apparatus of claim 2, wherein a spacer is interposed between the disk valve and the seat disk at an inner periphery side of the extension.

5. The cylinder apparatus of claim 3, wherein a spacer is interposed between the disk valve and the seat disk at an inner periphery side of the extension.

6. The cylinder apparatus of claim 2, wherein an air vent passage is provided which allows a space between the disk valve and the seat disk to communicate with a downstream side of the valve mechanism.

7. The cylinder apparatus of claim 3, wherein an air vent passage is provided which allows a space between the disk valve and the seat disk to communicate with a downstream side of the valve mechanism.

8. The cylinder apparatus of claim 4, wherein an air vent passage is provided which allows a space between the disk valve and the seat disk to communicate with a downstream side of the valve mechanism.

9. The cylinder apparatus of claim 5, wherein an air vent passage is provided which allows a space between the disk valve and the seat disk to communicate with a downstream side of the valve mechanism.

10. The cylinder apparatus of claim 4, wherein the spacer is thinner in thickness than the extension.

11. The cylinder apparatus of claim 5, wherein the spacer is thinner in thickness than the extension.

12. The cylinder apparatus of claim 6, wherein the spacer is thinner in thickness than the extension.

13. The cylinder apparatus of claim 7, wherein the spacer is thinner in thickness than the extension.

14. A valve mechanism for a cylinder apparatus to control a flow of a fluid, the valve mechanism comprising:
- a disk valve having an annular elastic seal member fixed to a first side thereof; and
- a pilot casing to which the elastic seal member is gas-tightly fitted to form a pilot chamber configured to apply a pressure therein to the disk valve;
- wherein the elastic seal member has an extension that is extended over an outer peripheral surface of the disk valve and fixed to a second side of the disk valve.

15. The cylinder apparatus of claim 7, wherein the first side of the disk valve is an opposite side relative to the second side of the disk valve.

* * * * *